United States Patent

Sanders

[11] 4,055,326
[45] Oct. 25, 1977

[54] NEEDLE VALVE MEMBER FOR A CONTROL DEVICE AND METHOD OF MAKING THE SAME

[75] Inventor: William J. Sanders, Greensburg, Pa.

[73] Assignee: Robertshaw Controls Company, Richmond, Va.

[21] Appl. No.: 661,059

[22] Filed: Feb. 25, 1976

[51] Int. Cl.² .......................................... F16K 31/00
[52] U.S. Cl. ................................. 251/351; 251/346; 138/46; 29/157.1 R; 251/368; 251/356
[58] Field of Search ............... 251/356, 358, 346, 351, 251/368; 138/46; 29/DIG. 11, 157.1 R; 72/347, 348

[56] References Cited

U.S. PATENT DOCUMENTS

| 681,681 | 9/1901 | Collewuie | 251/356 |
|---|---|---|---|
| 1,247,326 | 11/1917 | Porter | 251/356 |
| 1,320,843 | 11/1919 | Claus | 138/46 |
| 1,383,747 | 7/1921 | Noble | 72/347 |
| 1,854,651 | 4/1932 | Goodall et al. | 251/368 |
| 1,921,761 | 8/1933 | Leins | 251/356 |
| 2,137,854 | 11/1938 | Ordway | 138/46 |
| 3,381,352 | 5/1968 | Lindner et al. | 251/358 |

FOREIGN PATENT DOCUMENTS 1,356,778   5/1963   France ................................. 251/356

Primary Examiner—William R. Cline
Assistant Examiner—H. Jay Spiegel
Attorney, Agent, or Firm—Candor, Candor & Tassone

[57] ABSTRACT

A needle valve member for a control device having a passage provided with a valve seat for fuel flow therethrough, the needle valve member being adapted to cooperate with the valve seat for controlling the fuel flow therethrough while providing a minimum controlled fuel flow through the valve seat when the needle valve member is fully seated against the valve seat. The needle valve member comprises a drawn one-piece elongated substantially cup-shaped member having a thin tubular side wall and a thin end wall closing off one end of the tubular side wall, the end wall being adapted to close against the valve seat and having an opening therethrough to cause the minimum flow through the valve seat when the end wall is seated against the valve seat.

12 Claims, 5 Drawing Figures

NEEDLE VALVE MEMBER FOR A CONTROL DEVICE AND METHOD OF MAKING THE SAME

This invention relates to an improved needle valve member for a control device for a fuel-burning apparatus or the like as well as to a method of making such a needle valve member or the like.

It is well known that control devices for fuel burning apparatus have been provided wherein each has a passage means provided with a valve seat for fuel flow therethrough and containing a needle valve member for cooperating with the valve seat for controlling the rate of fuel flow therethrough while providing a minimum controlled fuel flow through the valve seat when the needle valve member is fully seated against the valve seat.

A prior known needle valve member comprises a part fabricated from extruded rod stock and having an opening drilled through the center thereof to provide for the minimum flow when the end of the needle valve member seats against the valve seat, the needle valve member having a plurality of integral longitudinal fins radiating therefrom to align the needle valve member in the passage of the control device so that fuel can flow around the external surface of the needle valve member between the fins thereof to the valve seat when the valve seat is opened by the needle valve member for larger flow requirements.

It is a feature of this invention to provide an improved needle valve member for such a control device or the like, the needle valve member of this invention being a drawn one-piece part and thereby being simple and economical to manufacture while still providing for accurate fuel control.

In particular, the needle valve member of this invention comprises a drawn one-piece elongated substantially cup-shaped member having tubular side wall means and a substantially flat end wall means and being substantially transverse thereto closing off one end of the tubular side wall means, the end wall means being adapted to close against the valve seat of the control device and having an opening therethrough to cause the minimum flow through the valve seat when seated thereagainst. The side wall means of the cup-shaped member has a substantially triangular transverse cross-sectional configuration while the passsage means of the control device has a substantially circular transverse cross-sectional configuration whereby fuel is adapted to flow through the passage means external of the side wall means to the valve seat. The cup-shaped member also has the side wall means stepped down adjacent the end wall means to define a reduced cylinder section between the triangular configuration and the end wall means so that the end wall means is cantilevered in the passage means. The cup-shaped member has a short interference fit with the passage means remote from the end wall means which together with the resiliency of the cup-shaped member causes the end wall means to be self-aligning with the valve seat when seated thereagainst.

Accordingly, it is an object of this invention to provide an improved needle valve member having one or more of the novel features set forth above or hereinafter shown or described.

Another object of this invention is to provide a method of making such a needle valve member or the like.

Another object of this invention is to provide a control device utilizing the needle valve member of this invention.

Another object of this invention is to provide a method of making a control device with the needle valve member of this invention.

Other objects, uses and advantages of this invention are apparent from a reading of this description which proceeds with reference to the accompanying drawings forming a part thereof and wherein.

Figure 1:
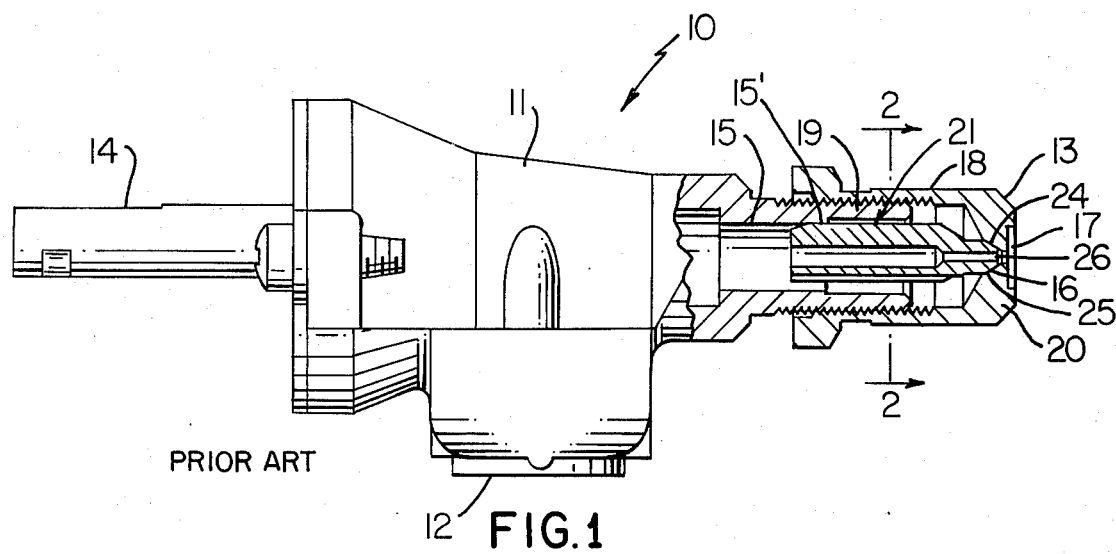
FIG. 1 is a cross-sectional view illustrating a prior art control device.

While the various features of this invention are hereinafter described and illustrated as being particularly adapted to provide a needle valve member for a control device of a fuel burning apparatus, it is to be understood that the various features of this invention can be utilized singly or in any combination thereof to provide a needle valve member for other apparatus as desired.

Therefore, this invention is not to be limited to only the embodiment illustrated in the drawings, because the drawings are merely utilized to illustrate one of the wide variety of uses of this invention.

Figure 2:
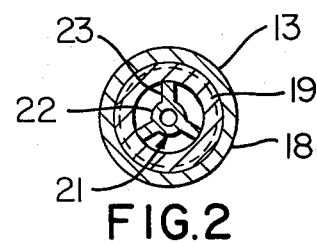
FIG. 2 is a cross-sectional view taken on line 2—2 of FIG. 1.

Referring now to FIGS. 1 and 2, a prior art fuel control device is generally indicated by the reference numeral 10 and comprises a housing means 11 having an inlet 12 adapted to be interconnected to a source of gaseous fuel and an outlet orifice cup or cap 13 adapted to be interconnected to a burner means (not shown) of a fuel burning apparatus (not shown) or the like in a manner well known in the art.

The housing means 11 has a control shaft 14 adapted to be rotated to an "on" position thereof to interconnect the inlet 12 with a passage means 15 that leads through the housing means 11 to the outlet cup 13 which has a substantially frusto-conical valve seat 16 leading to an outlet 17 as illustrated.

The orifice cup or cap 13 is substantially cup-shaped and has the side wall means 18 thereof internally threaded onto an externally threaded tubular part 19 of the housing means 11, the closed end wall 20 of the cup 13 containing the valve seat 16 and outlet 17.

The needle valve member 21 is disposed in the passage means 15 and comprises a metallic part formed from an extruded rod, the needle valve member 21 being so shaped that the same has a tubular body portion 22 provided with a plurality of outwardly directed integral and longitudinally disposed ribs or flanges 23 adapted to be press fitted in a reduced portion 15' of the passage means 15 so as to position an end 24 of the needle valve member 21 beyond the right-hand end of the tubular part 19 of the housing means 11 and adjacent the valve seat 16 of the cap 13 as illustrated. The end 24 of the needle valve member 21 has a frusto-conical valve seat 16 as illustrated in FIG. 1 to close off the seat 16. However, the end 24 of the needle valve 21 has a passage 26 drilled completely therethrough so as to fluidly interconnect the passage 15 to the opening or outlet 17 of the valve seat 16 at all times so that when the valve member 21 is fully seated against the valve seat 16 as illustrated in FIG. 1, a minimum fuel flow will still pass through the valve seat 16 because of the central passage 26 of the needle valve member 21. This minimum fuel flow can be an amount that will support combustion at the burner means of the apparatus utilizing the control device 10.

However, when the orifice cup 13 is threadedly adjusted on the housing means 11 so that the valve seat 16 is spaced from the end 24 of the needle valve member 21, fuel from the passage 15 can flow around the external surface of the tubular body member 22 of the needle valve member 21 intermediate the flanges 23 thereof and out through the open valve seat 16 to provide a greater flow of fuel to the burner means interconnected thereto, this additional gas flow around the needle 21 being added to the gas flowing through the drilled opening 26.

Thus, it can be seen that when a minimum gas flow is desired, the orifice cap 13 is positioned against the end 24 of the needle valve member 21 to seal off the gas flow at the valve seat 16 except for the amount that flows through the drilled hole 26 as previously described. However, should a larger gas flow be required, the orifice cap 13 is adjusted away from the end 24 of the needle valve member 21 so that a larger flow of gas can flow around the needle valve member 21 and out through the open valve seat 16.

As previously stated, it is a feature of this invention to provide an improved needle valve member for such a control device 10.

Figure 3:
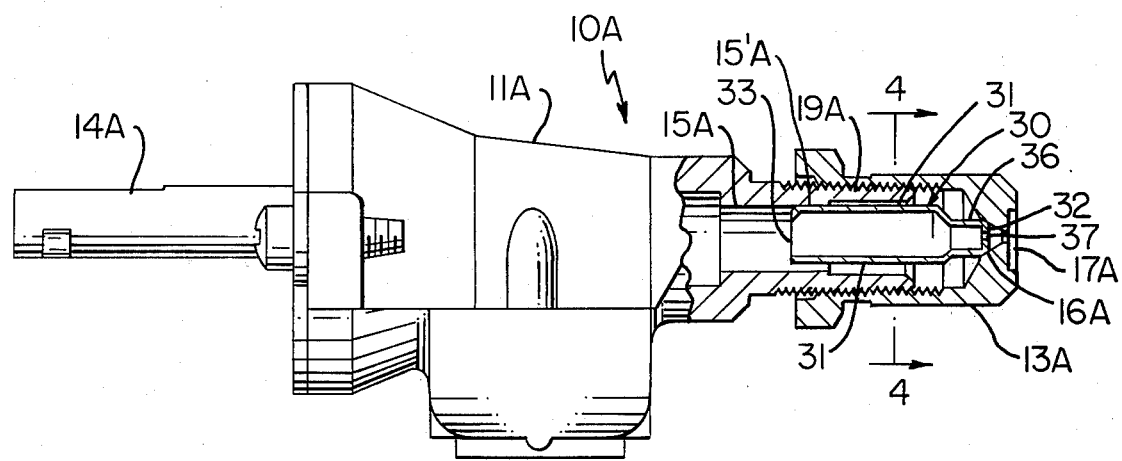
FIG. 3 is a view similar to FIG. 1 and illustrates the control device utilizing the needle valve member of this invention.
Figure 5:
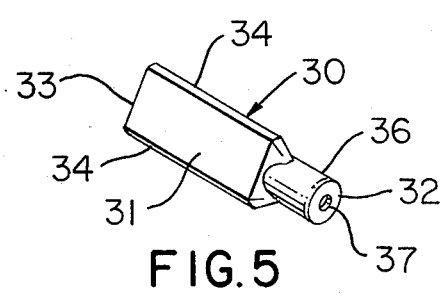
FIG. 5 is a perspective view of the needle valve member of this invention that is utilized in the fuel control device of FIGS. 3 and 4.
Figure 4:
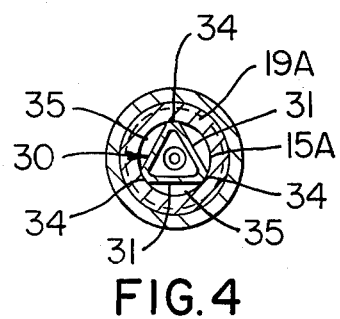
FIG. 4 is a cross-sectional view taken on line 4—4 of FIG. 3.

Accordingly, reference is now made to FIGS. 3 and 4 wherein the control device of this invention is generally indicated by the reference numeral 10A and parts thereof similar to the control device 10 previously described are indicated by like reference numerals followed by the reference letter "A".

It can be seen that the control device 10A of this invention is substantially identical to the control device 10 previously described except that in place of needle valve member 21 of FIGS. 1 and 2, the improved needle valve member of this invention is utilized and the same is indicated by the reference numeral 30.

The needle valve member 30 of this invention is formed by drawing a slug of brass material into the cup-shape illustrated in the drawings wherein the same has substantially thin tubular wall means 31 closed at one end by a thin end wall means 32 and remaining open at the other end 33 thereof as illustrated. The side wall means 31 of the needle valve member 30 define a substantially equilateral triangular transverse cross-sectional configuration as illustrated in FIG. 4 wherein the three apexes 34 thereof are adapted to be press fitted into the reduced portion 15'A of the passage means 15A which has a substantially circular transverse cross-sectional configuration. Such apexes 34 can be secured in the passage 15A by the aforementioned press-fit relation, welding, brazing, etc., as desired. In this manner, the spacing 35 of the passage means 15A between the apexes 34 of the tubular side walls means 31 of the needle valve member 30 are adapted to convey fuel therethrough to be directed to the valve seat 16A when the valve seat 16A is opened by the cap 13A being backed away from engagement with the end wall means 32 of the needle valve member 30 through its threaded relation with the tubular part 19A of the housing means 11A.

The side wall means 31 of the needle valve member 30 has a stepped down cylinder part 36 joining the major portion of the side wall means 31 with the substantially flat end wall means 32 that is disposed substantially transverse thereto whereby the stepped down part 36 mounts the end wall means 32 in substantially a cantilevered fashion from the right hand end of the tubular part 19A of the housing means 11A as illustrated in FIG. 3.

In this manner, when the cap 13A is threaded onto the threaded end 19A of the housing means 11A to close off the valve seat 16A, a sufficient length of the needle valve member 30 extends to the right in the drawings beyond the short interference fit or supported portion thereof in the reduced portion 15'A of the passage means 15A so that the freedom inherent in the short interference fit and the resiliency of the needle valve member 30 beyond the interference fit portion thereof will positively align the end wall 32 of the needle valve member 30 with the valve seat 16A as the same is nested into the frusto-conical valve seat 16A during the closing of the valve seat 16A against the end 32 of the needle valve member 30. In this manner, full closing of the seat 16A will be insured each time the end 32 of the needle valve member 30 is received therein.

It can be seen that the end wall 32 of the needle valve member 30 is provided with an opening 37 therethrough for providing a minimum flow through the passage means 15A when the valve seat 16A is fully seated against the end wall 32 of the needle valve member 30 for the reasons previously set forth.

Therefore, it can be seen that the needle valve member 30 of this invention is relatively simple in construction thereof and because the same can be readily drawn from a brass member, the same is relatively economical to manufacture and through the short interference fit and thin wall configuration thereof permits the same to be self aligning with the valve seat 16A during the closing of the valve seat 16A.

The operation of the control device 10A will now be described.

As previously stated, when it is desired to provide a minimum flow of fuel through the control device 11A, the orifice cap 13A is threaded onto the threaded part 19A of the housing means 11A until the frusto-conical valve seat 16A is fully closed against the end wall 32 of the needle valve member 30.

Should a misalignment exist between the end wall 32 of the needle valve member 30 and the valve seat 16A during the nesting movement of the valve seat 16A about the end wall 32 of the needle valve member 30 as valve seat closing operation is taking place, the extending part 36 of the needle valve member 30 beyond the short interference fit portion thereof supported in the reduced portion 15'A of the passage 15A of the housing means 11A is of a sufficient length that the same is somewhat resilient through the freedom inherent in the short interference fit and through the natural resiliency of the extending portion and thereby permits the end wall 32 to be moved into alignment with the valve seat 16A to fully close the same.

With the valve seat 16A fully closed by the end 32 of the needle valve member 30 as illustrated in FIG. 3, a minimum flow of fuel is adapted to pass from the passage 15A through the opening 37 in the end wall 32 of the needle valve member 30 and, thus, through the valve seat 16A and out of the outlet opening 17A to the desired burner or the like.

However, when it is desired to increase the flow of fuel out of the valve seat 16A, the orifice cap 13A is rotated to unthread the same from the threaded part 19A of the housing means 11A to the desired position where the valve seat 16A is moved away from abutting contact with the end wall 32 of the needle valve member 30 to thereby not only permit the flow of fuel through the opening 37 to pass out of the outlet 17A of the valve seat 16A, but also to permit fuel to flow between the apexes 34 of the needle valve member 30 in the spaces 35 of the passage means 15A external of the side wall 31 of the needle valve member 30 to the open valve seat 16A and, thus, out of the valve seat 16A for the reasons previously described.

Therefore, it can be seen that this invention not only provides an improved needle valve member and method of making the same, but also this invention provides an improved control device and method of making the same.

While the form and method of this invention now preferred have been described as required by the Patent Statute, it is to be understood that other forms and method steps can be utilized and still come within the scope of the appended claims.

What is claimed is:

1. In a control device having a passage means provided with a valve seat for fuel flow therethrough and a needle valve member for cooperating with said valve seat for controlling the fuel flow therethrough while providing a minimum controlled fuel flow through said valve seat when said needle valve member is fully seated against said valve seat, the improvement wherein said needle valve member comprises a drawn one-piece elongated substantially cup-shaped member having tubular side wall means and a substantially flat end wall means closing off one end of said tubular side wall means and being substantially transverse thereto, said end wall means being adapted to close against said valve seat and having an opening therethrough to cause said minimum flow through said valve seat when seated thereagainst, said cup-shaped member having said side wall means so arranged relative to said passage means that fuel is adapted to flow through said passage means and external of said side wall means to said valve seat, said side wall means having a substantially triangular transverse cross-sectional configuration while said passage means has a substantially circular transverse cross-sectional configuration, said cup-shaped member having said side wall means stepped down adjacent said end wall means to define a reduced cylinder section between said triangular configuration and said end wall means so that said end wall means is cantilevered in said passage means.

2. In a control device as set forth in claim 1, said cup-shaped member having said cylinder section terminating substantially at said flat end wall means.

3. In a control device as set forth in claim 1, said cup-shaped member being formed of brass.

4. In a method for making a control device having a passage means provided with a valve seat for fuel flow therethrough and a needle valve member for cooperating with said valve seat for controlling the fuel flow therethrough while providing a minimum controlled fuel flow through said valve seat when said needle valve member is fully seated against said valve seat, the improvement comprising the steps of drawing said needle valve member so as to comprise a drawn one-piece elongated substantially cupshaped member having tubular side wall means and a substantially flat end wall means closing off one end of said tubular side wall means and being substantially transverse thereto while being adapted to close against said valve seat, forming an opening through said end wall means to cause said minimum flow through said valve seat when said end wall means is seated thereagainst, said step of drawing said cup-shaped member causing said side wall means to be so arranged relative to said passage means that fuel is adapted to flow through said passage means and external of said side wall means to said valve seat, said step of drawing said cup-shaped member causing said side wall means to have a substantially triangular transverse cross-sectional configuration while said passage means has a substantially circular transverse cross-sectional configuration, and forming said side wall means of said cup-shaped member with a stepped down part adjacent said end wall means to define a reduced cylinder section between said triangular configuration and said end wall means so that said end wall means can be cantilevered in said passage means.

5. In a method of making a control device as set forth in claim 4, said step of forming said side wall means causing said cylinder section to terminate substantially at said flat end wall means.

6. In a method of making a control device as set forth in claim 4, the additional step of making said cup-shaped member from brass.

7. A needle valve member for a control device having a passage means provided with a valve seat for fuel flow therethrough so that said needle valve member can cooperate with said valve seat for controlling the fuel flow therethrough while providing a minimum controlled fuel flow through said valve seat when said needle valve member is fully seated against said valve seat, said needle valve member comprising a drawn one-piece elongated substantially cup-shaped member having tubular side wall means and a substantially flat end wall means closing off one end of said tubular side wall means and being substantially transverse thereto, said end wall means being adapted to close against said valve seat and having an opening therethrough adapted to cause said minimum flow through said valve seat when seated thereagainst, said cup-shaped member having said side wall means so arranged that when the same is disposed in said passage means, fuel is adapted to flow through said passage means and external of said side wall means to said valve seat, said side wall means having a substantially triangular transverse cross-sectional configuration, said cup-shaped member having said side wall means stepped down adjacent said end wall means to define a reduced cylinder section between said triangular configuration and said end wall means so that said end wall means is adapted to be cantilevered in said passage means.

8. A needle valve member as set forth in claim 7 wherein said cup-shaped member has said cylinder section terminate substantially at said flat end wall means.

9. A needle valve member as set forth in claim 7 wherein said cup-shaped member is formed of brass.

10. A method of making a needle valve member for a control device having a passage means provided with a valve seat for fuel flow therethrough while providing a minimum controlled fuel flow through said valve seat when said needle valve member is fully seated against said valve seat, said method comprising the steps of drawing said needle valve member so as to comprise a drawn one-piece elongated substantially cup-shaped member having tubular side wall means and a substantially flat end wall means closing off one end of said tubular side wall means and being substantially transverse thereto while being adapted to close against said valve seat, forming an opening through said end wall means so as to be adapted to cause said minimum flow through said valve seat when said end wall means is seated thereagainst, said step of drawing said cup-shaped member causing said side wall means to be so arranged that when the same is disposed in said passage means, fuel is adapted to flow through said passage means and external of said side wall means to said valve seat, said step of drawing said cup-shaped member causing said side wall means to have a substantially triangular transverse cross-sectional configuration, and forming said side wall means of said cup-shaped member with a stepped down part adjacent said end wall means to define a reduced cylinder section between said triangular configuration and said end wall means so that said end wall means is adapted to be cantilevered in said passage means.

11. A method of making a needle valve member as set forth in claim 10 wherein said step of forming said side wall means causes said cylinder section to terminate substantially at said flat end wall means.

12. A method of making a needle valve member as set forth in claim 10 and including the step of making said cup-shaped member from brass.

* * * * *